(12) United States Patent
Meadows

(10) Patent No.: US 7,481,537 B2
(45) Date of Patent: Jan. 27, 2009

(54) METHOD FOR CREATING KALEIDOSCOPIC INTERFACES FOR USE IN BIOFEEDBACK

(75) Inventor: Jonathan L. Meadows, Topeka, KS (US)

(73) Assignee: Beyond VR, LLC, Topeka, KS (US)

( * ) Notice: Subject to any disclaimer, the term of this patent is extended or adjusted under 35 U.S.C. 154(b) by 479 days.

(21) Appl. No.: 11/374,805

(22) Filed: Mar. 13, 2006

(65) Prior Publication Data

US 2007/0211215 A1 Sep. 13, 2007

(51) Int. Cl.
*G03B 21/14* (2006.01)

(52) U.S. Cl. .......................................... 353/1; 359/616

(58) Field of Classification Search .................. 353/1, 353/2, 46; 359/616, 617
See application file for complete search history.

(56) References Cited

U.S. PATENT DOCUMENTS 6,967,667 B2 * 11/2005 Dworsky et al. ............ 345/646
7,037,659 B2 * 5/2006 Cerrina et al. .................. 435/6
7,399,083 B2 * 7/2008 Bailey et al. .................... 353/1

* cited by examiner

*Primary Examiner*—William C. Dowling
(74) *Attorney, Agent, or Firm*—Bruce J. Clark

(57) ABSTRACT

A method for creating a biofeedback controlled Kaleidoscope is disclosed, where the Kaleidoscope is controlled by two or more streams of input derived from physiological measurements and provides positive and negative reinforcement for each of the streams of input, where the method includes the steps of selecting a Kaleidoscope Object for display on a monitor, creating the code that will produce the Kaleidoscopic Object on the monitor; determining at least one effect to be used as the Kaleidoscopic Effect desired to respond to a first anticipated physiological input change where the effect is either texture or vertice manipulation; creating the code for the Kaleidoscopic Effect that operates on the Kaleidoscopic Object in response to a physiological measurement; selecting as a Second Effect at least one additional effect from the group consisting of the remaining Kaleidoscopic Effect and the Non Kaleidoscope Effects in which said Second Effect responds independently to a second anticipated physiological input change; creating the code for the selected Second Effect.

5 Claims, 7 Drawing Sheets

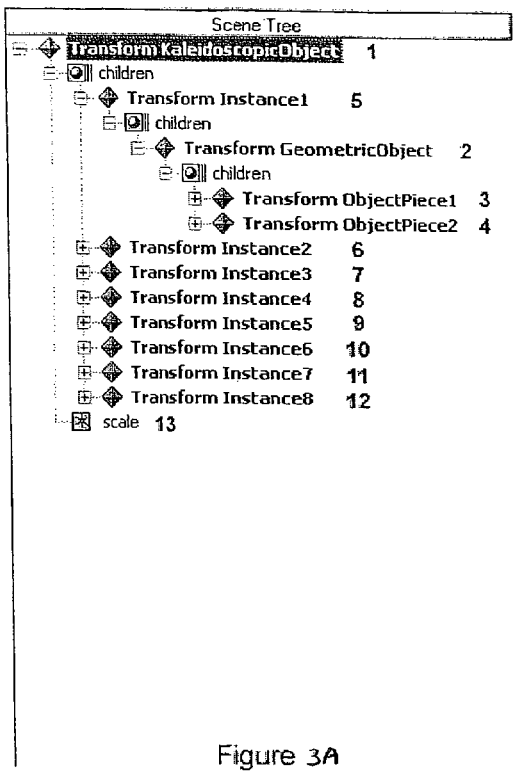

Figure 3A

```
1    #VRML V2.0 utf8
2
3    DEF KaleidoscopicObject Transform {
4        children [
5            DEF Instance1 Transform {
105          }
106          DEF Instance2 Transform {
107              children  USE GeometricObject
108              rotation  0 0 -1  0.785397
109          }
110          DEF Instance3 Transform {
111              children  USE GeometricObject
112              rotation  0 0 -1  1.57079
113          }
114          DEF Instance4 Transform {
115              children  USE GeometricObject
116              rotation  0 0 1  3.92699
117          }
118          DEF Instance5 Transform {
119              children  USE GeometricObject
120              rotation  0 0 1  3.1416
121          }
122          DEF Instance6 Transform {
123              children  USE GeometricObject
124              rotation  0 0 1  2.3562
125          }
126          DEF Instance7 Transform {
127              children  USE GeometricObject
128              rotation  0 0 1  1.57079
129          }
130          DEF Instance8 Transform {
131              children  USE GeometricObject
132              rotation  0 0 1  0.785397
133          }
134      ]
135      scale 0.1 0.1 0.1
136  }
```

Figure 3B

```
22   geometry  DEF VertexSet1 IndexedFaceSet {
23     coord    DEF VertexSet1coordinates Coordinate {
24        point    [ 0  1  0,
25                   1  1  0,
26                   1 -1  0,
27                   0 -1  0,
28                  -1 -1  0,
29                  -1  1  0 ]
30     }
31     color    DEF VertexSet1color Color {
32     color      [ 0  0  1,
33                  0  1  0,
34                  1  1  0,
35                  1  0  0,
36                  0  1  0,
37                  0  1  1 ]
38     }
39     coordIndex    [ 0, 1, 2, 3, -1 ]
40     colorIndex    [ 0, 1, 2, 3, -1 ]
41     ccw TRUE
42     convex   FALSE
43     solid    FALSE
44     creaseAngle 0
45     normalIndex [  ]
46     texCoordIndex    [  ]
47   }
48 }
```

Figure 5

```
19 texture    ImageTexture {
20    repeatS TRUE
21    repeatT TRUE
22    url "someTexture.jpg"
23 }
24 textureTransform  TextureTransform {
25    translation 1 2
26    rotation    3.141
27    scale    3 4.5
28    center   0 0
29 }
```

Figure 6

METHOD FOR CREATING KALEIDOSCOPIC INTERFACES FOR USE IN BIOFEEDBACK

BACKGROUND OF THE INVENTION

This invention relates to the fields of biofeedback and virtual reality programming.

In the biofeedback field, a client who is undergoing biofeedback treatment is typically connected to a computer via one or more sensors. These sensors are often connected to various parts of the head to sense brain waves, and are also connected to measure other physiological conditions, such as heart rate, temperature, galvanic skin response, EMG, and EEG. These sensors, with amplifiers that gather the data, are connected to a computer system with software to acquire the data, and through various programming means, a certain display is created on a monitor for the client to view. As the data is displayed and created, the client is encouraged to control one or more of the measured physiological conditions to affect the display in a desired format. It is important to convey the data to the user in a useful and informative manner, which usually requires some type of data visualization method, but can include methods that are purely auditory or tactile. A meter bar or real-time line graph are common visualization examples, as are various 3D objects. Consequently, it is both desirable and necessary in biofeedback to have an effective and efficient display technique with which a client can interface, and to also be able to do so for both positive and negative reinforcement. Interfacing here refers to the client's visually or audibly sensing what is seen on the monitor and/or heard for the client to effectively control independently two or more physiological conditions so as to change the display.

The invention then is a kaleidoscopic object and effect (together a kaleidoscope), and method for creating a kaleidoscopic object and effect that is controllable in its appearance by physiological input to control the size, movement (vertice manipulation), color saturation, brightness and/or texture in real time in response to controlled physiological input. Kaleidoscope, and Kaleidoscopic Interface, are also used interchangeably herein.

This is accomplished in part using VRML, an acronym for Virtual Reality Modeling Language. It is a standardized file format specification for describing the modeling and animation of three-dimensional geometric objects. A VRML scene is defined by a text data file. A VRML scene may also contain animation information. Using VRML, a 3D scene is defined in a written language in terms of nodes, fields and events. Nodes are abstraction of real-world objects and concepts. Each type of node has a fixed set of fields and events. A field is a property or attribute of a node that can hold and sometimes receive and/or pass a value. Fields may contain data, much like a variable or array does in computer programming. There are two types of events—eventIn and eventOut.

By using a process called 'routing', messages can be sent between nodes along routes that are formed by and eventOut connected to an eventIn. A field that's combined with an eventIn and eventOut has the characteristics of all three components and is called an exposedField. Nodes are organized into a hierarchical representation of a 3D scene called a scene graph or scene tree.

Because VRML is a file format specification (a data file) and not executable code (a program), it is necessary to use a program capable of interpreting the VRML file and rendering it to the computer monitor for visual display. The rendering process also includes the handling of any real-time modifications used for animations, or for providing user interactivity. A program is also required to make it possible for a VRML scene to react to data generated from outside of the 3D scene itself. This is accomplished by the program gathering external date in whatever way is most relevant, and passing it 'in' to a rendered VRML scene via an eventIn, so that the data is accessible to the scene graph via eventOuts or exposedFields. A rendering engine (renderer) is required for a computer to display a 3D graphics scene, and usually has means to input data "in" to a scene, and to get/receive data from the scene in real time, so that bi-directional communication can be established between the scene's environment itself and application (executable code), or sets of applications, needing to interface with the scene.

It is an object of the invention to provide an interface display (object) and method for creating an interface display in biofeedback that allows for independent control of various features of the display in real time in response to corresponding independent control by the client so as to create a Kaleidoscopic effect having two or more features independently controlled by physiological inputs, that suggest to the client as to what the client is and is not supposed to do.

It is a further object of the invention to create an interface for biofeedback display in the form of a kaleidoscope capable of being manipulated in real time, including a process for handling incoming data from a biofeedback system, and to take said data and use it to manipulate the kaleidoscope so as to provide both an aesthetically rewarding and intuitively operational interface for biofeedback training. Other objects and features of the invention will be apparent as set forth in the detailed description and claims.

DESCRIPTION OF THE DRAWINGS

FIG. 3a shows the Kaleidoscopic Object Scene Tree.

FIG. 3b shows the Kaleidoscopic Object Scene Tree Syntax.

FIG. 5 shows the Object Piece Vertex Syntax.

FIG. 6 shows the Object Piece Texture Syntax.

DESCRIPTION OF THE PREFERRED EMBODIMENTS

Figure 1:
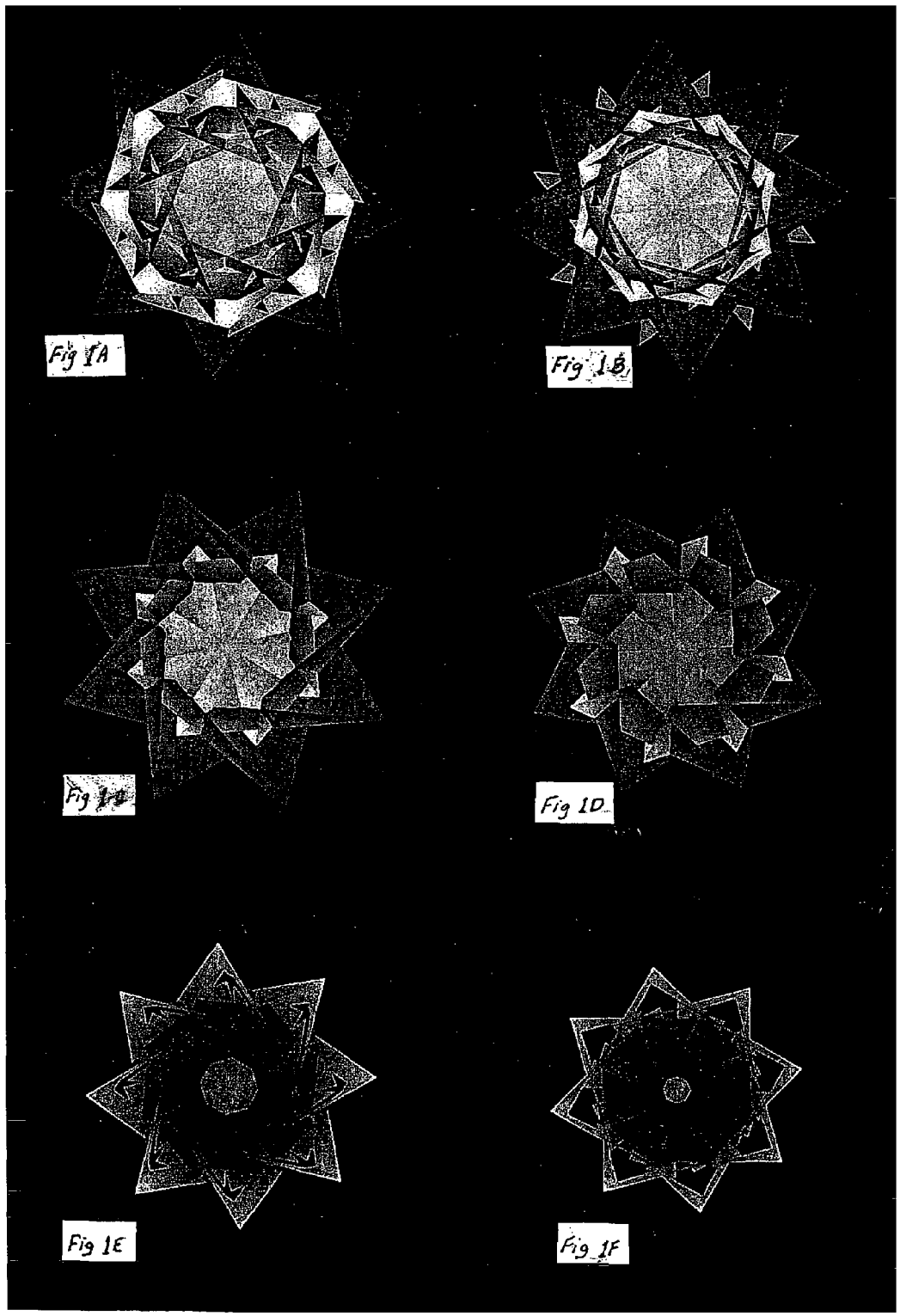
FIG. 1a-1f shows a sequential series of six screenshots of a sample kaleidoscope utilizing the inventive method, taken at different states using vertice manipulation as the kaleidoscopic effect.
Figure 2:
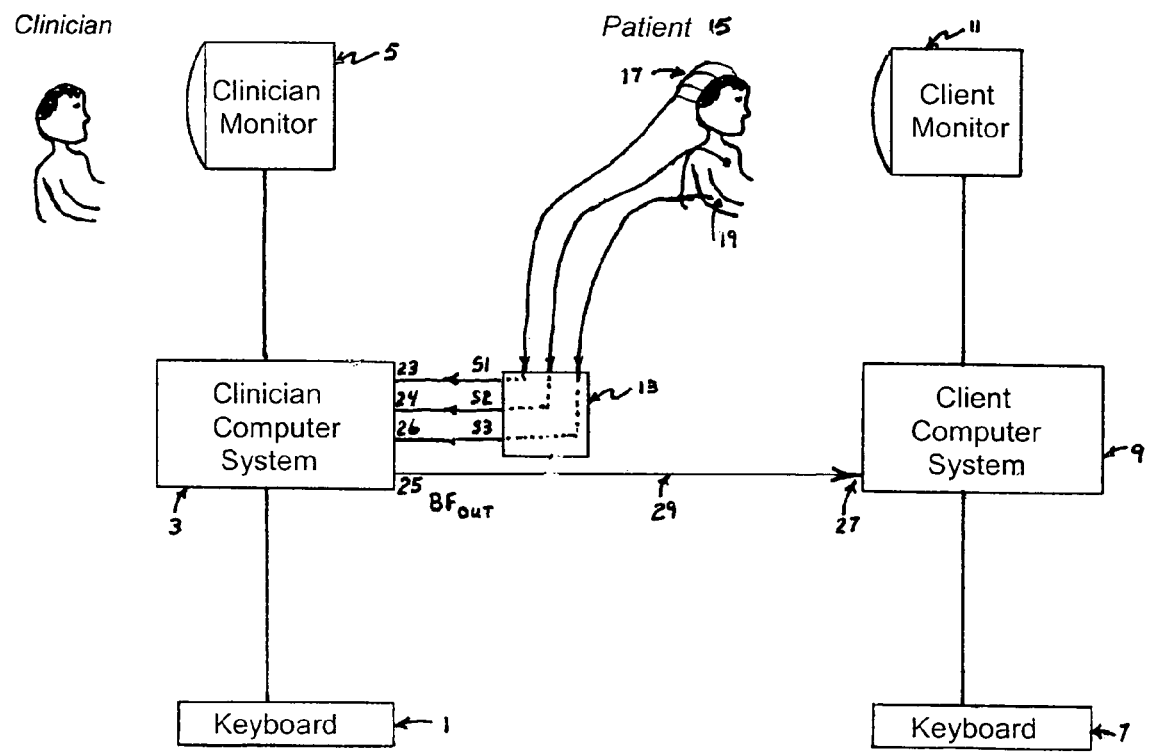
FIG. 2 shows the system used.
Figure 3C:
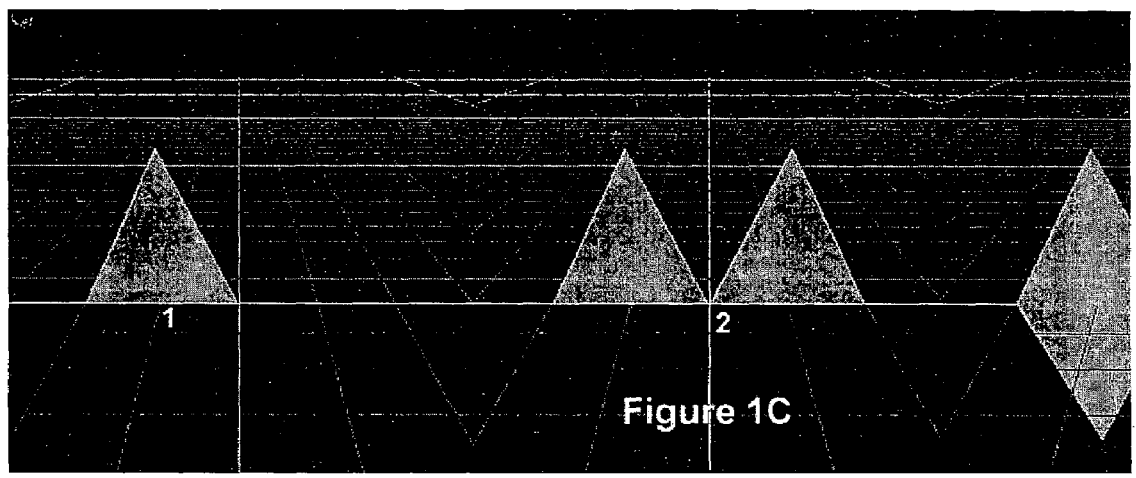
FIG. 3C shows the Symmetrical Construction of a Kaleidoscopic Object.
Figure 4:
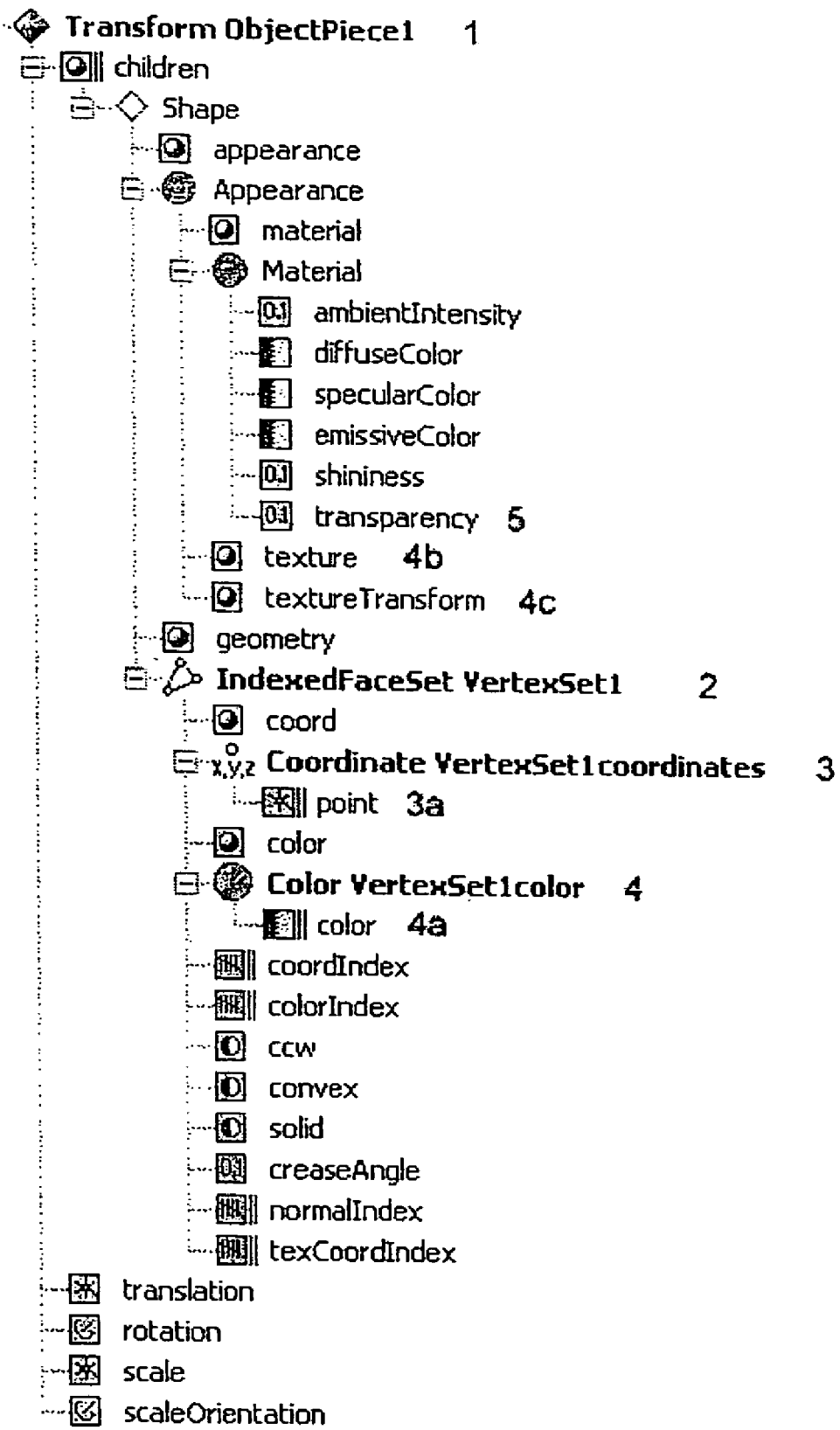
FIG. 4 shows the Object Scene Tree.

The system necessary for utilizing the method is described in U.S. Pat. No. 6,758,813 and the description therein is incorporated herein by reference. FIG. 2 shows the preferred typical system. It can be seen that the client 19 views the client monitor 8 and preferably learns to control his/her measured physiological conditions that are being measured by sensors 15, 17 and 19, so as to affect, through clinician computer system 3 and client computer system 9, the display being shown on the client monitor 8. The two computer systems can also be one combined system, with only one monitor. It should also be understood that 'monitor' is used broadly and is defined to include, any visualization means or image creation means, including CRT display, LCD or plasma display, holographic display, glasses having the capability for display, or even mentally induced images.

The method herein involves the creation of an interface that provides a kaleidoscopic type effect that is not only pleasing to the human eye, but interesting and effective at carrying out the object of the invention. FIG. 1a-1f shows a sample of a sequential series of screenshots of a sample Kaleidoscopic image where the image is changed in real time utilizing vertice manipulation as the Kaleidoscopic effect discussed further herein. The kaleidoscopic effect in the preferred mode is pseudo-random although a random mode is envisioned. The term pseudo-random as used herein refers not only to random, but to slightly less than literal randomness but having a multitude of possible kaleidoscopic effects being shown in real time.

The method is comprised of first selecting a general desired kaleidoscopic object which will be the visual interface that will change in response to changes in the physiological measurements. It is then necessary to determine what features (effects) in the general kaleidoscopic object will be modifiable in response to changes in the physiological measurements so as to create the Kaleidoscope. The effect will then be modified in real time by the client to control the measured physiological responses.

In the preferred mode, at least two of the features will be modifiable, independently by the client. Those features particularly suited and useful in the biofeedback setting are the size, the color saturation, brightness, vertice manipulation and texture. Other features can be included to be modifiable, such as transparency, but because of the need in a biofeedback setting and because of human perception, these features have been found to be particularly effective. Two of these features provide an effect that either one of which will give a Kaleidoscopic effect, the vertice manipulation and the texture manipulation. The others are Non Kaleidoscopic effects by themselves, but provide interesting effects when combined with one of the Kaleidoscopic effects. Each of the Non Kaleidoscopic Effects can also be broken down into sub effects, such as different colors, that are independently controlled by the client. The term Effects as used herein refers to any of the Kaleidoscopic or Non kaleidoscopic effects.

Texture manipulation involves the changing of the surface properties in the faceset. Texture changes is a feature that gives the object a kaleidoscopic effect. Texture manipulation is also referred to as suface manipulation. This is achieved by changing the texture scaling and placement.

Vertice manipulation provides a means of displaying a different type of kaleidoscopic effect. Vertice manipulation changes the location of the points that define the faceset. Changing the location of the points allows for changes in the physical structural appearance such as the number of points in the object even affecting the 3D appearance.

Changing the size of the kaleidoscope object is accomplished generally by changing the scaling.

Changing the color saturation affects the color saturation in the faceset giving the kaleidoscope a different look, but not affecting the kaleidoscope effect.

Changing the brightness also is performed on the faceset.

The kaleidoscope, in the preferred mode, is created by first creating a faceset. The faceset can then be 'mirrored' or connected to a cloned faceset segment and continually so in a full 360 degree manner, such that the last repeated faceset 'segment' connects to the first, creating a continuing loop of cloned facesets. In an alternative kaleidoscope two or more various faceset segments are created and instead of one faceset mirrored or connected to its clone, it is instead alternately or in any repetitious fashion connected to a clone of another faceset, creating a complex display of two or more varying facesets. In any event, a symmetrical kaleidoscope object is created.

Changing the vertices in the faceset, and/or the texture of the faceset, creates the kaleidoscopic effect.

Once the kaleidoscope object is created, the two or more desired biofeedback conditions being measured in the client are associated with the effects, at least one of which is the vertice manipulation or the texture manipulation.

In the preferred mode, the creation of the particular kaleidoscopic effect for a feedback interface is done in part using VRML. It should be noted that VRML is a 3D file format specification composed of nodes containing multiple types of fields (specifically—eventIns, eventOuts, and fields), and that the majority of said fields are modifiable in real-time. By modifying the fields in real-time, one can use VRML to make an animated and interactive 3D scene. Fields can be modified by the content of the scene itself, or via an external application sending data "in" to the scene. VRML should not be thought of as a file format that only facilitates the display of static imagery (like a picture). VRML is inherently capable of real-time modifications used for animation and interactivity.

Because VRML is an ISO-ratified "file format" and not a "program", it is necessary to use a program capable of interpreting the code in the VRML file and "rendering" it to the computer monitor for visual display. Such a program is one made by Parallel Graphics, called CORTONA. The rendering process also includes the handling of any real-time modifications used for animations, or for providing user interactivity. A program is also required to make it possible for a VRML scene to react to data generated from "outside" of the 3D scene itself. A program made by BeyondVR, LLC of Topeka, Kans. called CYBERNETIC INTERFACE SYSTEM (CIS) is one such program. This is accomplished by the CIS gathering the external data in whatever way is most relevant, and passing it "in" to a rendered VRML scene itself (via an "eventIn" field type) so that the data is accessible to the scene via the fields of nodes.

Inasmuch as VRML is capable of encapsulating ECMAscript, Java, VBscript, and even executable code (via a proprietary method), the standard characteristics usually referred to when conceptually differentiating a data file from a program can become somewhat blurred. VRML files are data files. However, these data files are capable of containing within them miniature programs or scripts responsible for the handling of things happening within the 3D scene/environment. The processing of scripts is usually handled by the renderer.

The next step is the creation of a "kaleidoscopic object", and a "kaleidoscopic effect" used in conjunction with each other. The kaleidoscopic object requires the symmetric repetition of a geometric object, or set of geometric objects. The kaleidoscopic effect requires animation of the vertices of the kaleidoscopic object, or the animation of the surface characteristics of the kaleidoscopic object.

The geometric object used to build the kaleidoscopic object is created by connecting multiple vertices in three-dimensional coordinate space to form planar surfaces. The geometric object created in this manner can be as simple as a triangle, or as complex as any three-dimensional shape. This object, or mirror images of said object, are then repeatedly copied and placed in new locations (or the same location) but with individually distinct directional orientations to form a symmetrical pattern.

Once a kaleidoscopic object has been created, a kaleidoscopic effect is created to be used on it. One kaleidoscopic effect is accomplished by manipulating the "position" or location of the kaleidoscopic object's vertices in real-time. Positional manipulation of the vertices is accomplished by inputting new coordinates in the vertices' coordinate fields. The manner in which the new coordinates are determined is a matter of artistic design coupled with the physiological design requirements of biofeedback. Moreover, there preferably is a pleasing and a nonpleasing aspect to the Kaleidoscope so as to discourage certain physiological responses. Reward is key to the proper implementation of biofeedback. A person will not produce the desired physiological response if he or she is not able to differentiate from what he or she should and shouldn't be doing.

As previously discussed, another means to provide a kaleidoscopic effect is by making real-time modifications to the visual surface characteristics of the kaleidoscopic object. The visual surface characteristic requiring modification is the kaleidoscopic object's surface "texture". A surface texture is a 2D bitmap image that can be thought of as a skin that is pasted on the surface of the object and wrapped over every last bit of it. Surface texture manipulations that can be modified in real-time to provide a kaleidoscopic effect are the amount of times the surface pattern repeats itself (scaling) over the kaleidoscopic object, the orientation of the surface texturing, and the pattern of the texture itself. As with manipulations of the kaleidoscopic object's vertices, it is also important to develop surface texture manipulations that are perceived as rewarding or unpleasant to look at.

After one or both of the possible kaleidoscopic effects have been defined for use with the kaleidoscopic object, it is necessary to set up additional visual components of the kaleidoscopic object so that they can be modified in real-time to provide additional visual information related to biofeedback training. Most biofeedback training protocols requires the user to control multiple aspects of their physiology. Because of this, there should be a means to provide additional visual cues for each of the physiologically-derived variables used in a particular biofeedback protocol. These additional visual cues are each capable of being modified in real-time independently of each other. This independence is important, as it allows the user to learn how to better differentiate between their required physiological responses.

Additional visual manipulations to be used in conjunction with the kaleidoscopic effects are the manipulation of the kaleidoscopic object's overall size, brightness, color saturation, and transparency. Technically speaking, these aspects could be modified within the kaleidoscopic effects themselves. However, doing so is counterproductive to the need for these visual aspects to be easily independently modifiable by making the modification process more convoluted than necessary.

The VRML specification includes fields that define an object's size (scale) and transparency. The kaleidoscopic object's overall size can be modified by inputting new values in the provided "scale" field for the object. Size could also be changed by modifying each of the kaleidoscopic object's vertices, but this is counterproductive given the availability of the VRML specification's scale field. The kaleidoscopic object's transparency can be modified by inputting new values into the "transparency" field of the kaleidoscopic object's material appearance. Transparency could also be modified by modifying the texture used by the kaleidoscopic effect. However, this too would be counterproductive as it entangles the independent manipulation of the kaleidoscopic effect with the manipulation of transparency.

Color, color saturation, and brightness are modified by inputting new values into the "color" field of an object's material appearance node. However, it should be noted that the VRML specification does not provide a means to independently set an object's color, color saturation, and brightness. The VRML specification uses RGB (red, green, blue) color space mapping for an object's "color" fields. The preferred method requires that these visual aspects can be controlled independently. Therefore, it is necessary to independently determine values for color, color saturation, and brightness, and then calculate an RGB value for use in the "color" field that is a product of the three color-related variables. As with all other visual cues provided by the kaleidoscope, it is also important that the kaleidoscope is made more pleasing to look at, or not, when the user is producing the desired or undesired, respectively, physiological responses.

Once the kaleidoscope is created that has the desired variable features, then these features are associated with each of the desired physiological variables that are being independently monitored and varied by the client.

In more detail and in carrying out these steps more specifically, FIGS. 3A, 3B, 3C, 4, 5 and 6. These figures show sample VRML code, including the VRML scene trees and syntax for the creation of a kaleidoscopic effect. Syntax here is used and defined as a broad term not only to include VRML, but also to include any software, programming language, format or executable.

For convenience, and in keeping with the generally accepted referencing in VRML, these references to line numbers in FIGS. 3A, 3B, 3C and FIGS. 4, 5, and 6, will be referred to with the line number following the figure number. For example, 3A-1 refers to line 1 in FIG. 3A.

The creation of a biofeedback-controlled Kaleidoscope requires a "kaleidoscopic object" 3A-1 and a "kaleidoscopic effect" used in conjunction with each other. FIG. 3A shows one Kaleidoscopic Object Scene Tree in VRML. A kaleidoscopic object 3A-1 is composed of the repetitive, and symmetric, placement 3A-1 through 12, 3B-108, 3B-112, 3B-116, 3B-120, 3B-124, 3B-128*m* 3B-132, 1C-1,2,3, of a geometric object 3A-2, or set of geometric objects 3A-3, 3A-4. A kaleidoscopic effect requires positional animation of the vertices 2-3*a* of the kaleidoscopic object 1A-1.

The geometric object 3A-2 used to build the kaleidoscopic object 3A-1 is created by connecting multiple vertices in three-dimensional coordinate space 5-24 through 5-29 to form planar surfaces 5-22. The geometric object 5A-3 created in this manner can be as simple as a triangle, or a complex three=dimensional shape. This object 5A-3, or mirror images of said object 5A-4, are then repeatedly copied and place in new locating (or the same location) but with individually distinct directional orientations to form a symmetrical pattern 3A-5 through 3A-12, 3B-108, 112, 116, 120, 124, 128, 132.

Once a kaleidoscopic object 3A-1 has been created, it is possible to use it to provide a kaleidoscopic effect. A kaleidoscopic effect is accomplished by manipulating the location of the kaleidoscopic object's vertices 5-24 through 5-29 in real time. Position manipulation of the vertices is accomplished by inputting new coordinates from a script or interpolator in the vertices' coordinate fields 4-3A to create the desired appearance or design. It is important to note that the term vertice here not only refers to traditional 'points' in polygonal objects, but also to corresponding 'points' in splines and nurbs.

Another means to provide a kaleidoscopic effect is by making real time modifications to the visual surface characteristics 4-4B, 4-4C of the geometric object(s) 3A-3, 3A-4 composing the kaleidoscopic object 3A-1. The visual surface characteristics requiring modification are related to the object's surface "texture". A surface texture 4-4B is a 2D bitmap image that can be thought of as a skin that is pasted on the surface of the object in real time and wrapped over every last bit of it. Surface texture manipulations that can be modified in real time to provide a kaleidoscopic effect, are the amount of times the surface pattern repeats itself 6-27 over the kaleidoscopic object 3A-1, the orientation of the surface texturing 6-26, and the pattern of the texture itself 6-19, 6-22.

As with manipulations of the kaleidoscopic object's vertices, it is important to develop surface texture manipulations that are perceived by the user as rewarding, or not, to look at.

After one or both of the possible kaleidoscopic effects have been designated for use with the kaleidoscopic object 3A-1, it is necessary to set up additional visual components of the kaleidoscopic object 3A-1 so that they can be modified in real time to provide additional visual information related to biofeedback training. Most biofeedback training protocols require the user to control multiple aspects of their physiology. Because of this, there should be a means to provide additional visual cues for each of the physiologically-derived variables used in a particular biofeedback protocol. These additional visual cues are each capable of being modified in real time independently of each other. This independence is important, as it allows the user to learn how to better differentiate between their required physiological responses.

Additional visual manipulations to be used in conjunction with the kaleidoscopic effects are the manipulation of the kaleidoscopic object's 3A-1 overall size 3A-13, brightness 4-4A, color saturation 4-4A, and transparency 4-5. Technically speaking, these aspects could be modified within the kaleidoscopic effect using surface texture manipulation 6-10, 6-22. However, doing so is frequently counterproductive to the need for these additional visual aspects to be easily independently modifiable, by making the modification process more convoluted than necessary when combining two or three independent processes into one.

The VRML specifications includes fields that define an object's size (scale) and transparency. The kaleidoscopic object's 3A-1 overall size 3A-13 can be modified by inputting new values in the provided scale 3A-13 field for the object. Size could also be changed by modifying each of the kaleidoscopic object's vertices 5-24 through 5-29, but this is counterproductive given the availability of the VRML specification's scale field. The kaleidoscopic object's 3A-1 transparency can be modified by inputting new values into the transparency field 4-5 of the kaleidoscopic object's 3A-1 material appearance. Transparency could also be modified by modifying the texture 6-19 used by the kaleidoscopic effect. However, this too would be counter productive as it entangles the independent manipulation of the kaleidoscopic effect with the manipulation of transparency.

Color, color saturation, and brightness can be modified by inputting new values into an object's color field 4-4a. However, it should be noted that the VRML specification does not provide a means to independently set an object's color, color saturation, and brightness. The VRML specification uses RGB (red, green, blue) color space mapping for an object's color fields. Thus the color field is a 'product' of RGB calculations. The preferred method requires that these visual aspects (color, color saturation or brightness) can be controlled independently. Therefore, it is necessary to independently determine values for color, color saturation, and brightness, and then calculate an RGB value fo use in the color field 4-4A that is a product of the three color-related variables.

In the biofeedback setting then, the sensors sense the measured physiological responses. The sensor data is acquired and preprocessed by an amplifier 13 (FIG. 2) before being made available to the clinician computer system 3. The data is then passed to a data visualization program with a graphics rendering engine so that a scene used to provide feedback can react to the physiological data and have the results of the updated reaction rendered (drawn) to the monitor 8. Using multiple monitors and computers is preferred though not required so data presentation related to the acquisition and processing of physiological data can be shown on a screen separate from the display of the feedback interface thus reducing visual clutter and allowing the user to better focus on the information being presented.

Consequently it will be seen that the kaleidoscope along with its attractive design, ability to change size, color and oscillation rate, utilizing the method herein, inherently allows an attractive and effective way of interfacing with the client in biofeedback treatment.

I claim:

1. A method for creating a biofeedback controlled Kaleidoscope, where the Kaleidoscope is controlled by two or more streams of input derived from physiological measurements and provides positive and negative reinforcement for each of the streams of input, comprised of the steps of:
   a. Selecting a geometric object to utilize by multiple repetition so as to create a Kaleidoscope Object on a monitor;
   b. Create a code that will produce the Kaleidoscopic Object on the monitor;
   c. Determine at least one effect to be used as a Kaleidoscopic Effect desired to respond to a first anticipated physiological input change where the effect is either texture or vertice manipulation;
   d. Create a code for the Kaleidoscopic Effect that operates on the Kaleidoscopic Object in response to a physiological measurement;
   e. Select as a Second Effect at least one additional effect from the group consisting of the remaining Kaleidoscopic Effect and Non Kaleidoscope Effects in which said Second Effect responds independently to a second anticipated physiological input change;
   f. Create a code for the selected Second Effect.

2. The method in claim 1, wherein the Kaleidoscopic Effect and the Second Effect both provide for a visual indication that is considered a desirable effect encouraging positive responses so as to act as positive reinforcement, and an undesirable effect that discourages negative responses so as to act as negative reinforcement.

3. A method for creating a biofeedback controlled Kaleidoscope for use in biofeedback, where the Kaleidoscope is controlled by two or more streams of input derived from physiological measurements and provides positive and negative reinforcement for each of the streams of input, comprised of the steps of:
   a. Selecting a geometric object to utilize by multiple repetition so as to create a Kaleidoscope Object on a monitor;
   b. Create a code that will produce the Kaleidoscopic Object on the monitor;
   c. Create a code for a Kaleidoscopic Effect that operates on the Kaleidoscopic Object in response to a physiological measurement;
   d. Create a code for texture manipulation and for vertice manipulation as Kaleidoscopic Effects to operate on the Kalediocopic Object independently in response to a first anticipated physiological input change and second physiological input change, respectively.

4. A method for creating a biofeedback controlled Kaleidoscope for use in biofeedback, where a Kaleidoscope is controlled by two or more streams of input derived from physiological measurements and provides positive and negative reinforcement for each of the streams of input, comprised of the steps of:
   a. Selecting a geometric object to utilize by multiple repetition so as to create a Kaleidoscope Object on a monitor;

b. Create a code that will produce the Kaleidoscopic Object on the monitor;
c. Determine at least one effect to be used as a Kaleidoscopic Effect desired to respond to a first anticipated physiological input change where the effect is either texture or vertice manipulation;
d. Create the code for the Kaleidoscopic Effect that operates on the Kaleidoscopic Object in response to a physiological measurement;
e. Select as a Second Effect and Third Effect color saturation manipulation and size manipulation, as Non Kaleidoscopic Effects, in which said Second Effect and Third Effects respond independently to a second anticipated physiological input change and third anticipated physiological input change;
f. Create the code for the Second Effect and Third Effect that allows for the said Effects to operate independently on the Kaleidoscopic Object in response to a respective second anticipated physiological input change and third anticipated physiological input change.

5. The method in claim 4 having the additional steps of:
a. inputting a location of the vertice of the Kaleidoscopic Object into the coordinate field of a VRML file to accomplish vertice manipulation;
b. inputting values for color saturation for the Kaleidoscopic Object into the Color field of a VRML file to accomplish Color saturation manipulation;
c. inputting values for the Kaleidoscopic Object into the scale field of a VRML file to accomplish the size manipulation.

\* \* \* \* \*